July 19, 1955 E. D. HIRSCH 2,713,471

TELEPHONE STAND FOR CIRCULAR OR OVAL TYPE

Filed July 24, 1952

Eric D. Hirsch
INVENTOR.

BY Clarence A. O'Brien
and Harvey B. Jacobson
Attorneys 2,713,471

TELEPHONE STAND FOR CIRCULAR OR OVAL TYPE

Eric D. Hirsch, Memphis, Tenn.

Application July 24, 1952, Serial No. 300,585

1 Claim. (Cl. 248—346)

The present invention relates to support means for a so-called French type telephone which is provided with either a circular or oval base, said means being in the form of a head which is attachable to the upper end of a pedestal in order that the pedestal and head may then combine in providing a satisfactory portable telephone stand.

One object of the invention is to structurally, functionally and otherwise improve upon similarly performing and constructed prior art supports and, more particularly, to improve upon Patent 2,067,323 granted to me on January 12, 1937.

In order to appreciate the nature of the instant invention it seems advisable to make brief reference to my prior Patent 2,067,323 reference to which will reveal a stand for telephone subscribers' sets which is characterized by a base, a vertical standard attached to and rising from the base, a head on the upper end of the standard and upon which the telephone is adapted to rest for support. Jaw members are provided on said head and these are engageable with the base of the telephone and means serves to connect the jaws to the head for swivel and pivotal movements of the jaws and spring means yieldably urges the jaws in position for engaging the base of the telephone.

The instant invention is likewise characterized by a head to rest atop a vertical standard on a pedestal or the like and the head here is characterized by a flat substantially rectangular panel. Jaws are mounted on the top surface of the panel adjacent the opposite ends of said panel and the jaws have overhanging grips for cooperation with the diametrically opposite peripheral portions of the base of the telephone. By contrast, however, the jaws here have headed screws attached to their body portions and operating in slots in the panel, cushioning springs being provided for the desired cushioning effects. A further feature has to do with keyways provided in the end portions of the panel and keys fixed to the jaws and slidable back and forth in the keyways.

Objects and advantages in addition to those above evident will become clear from the following description.

Figure 3:
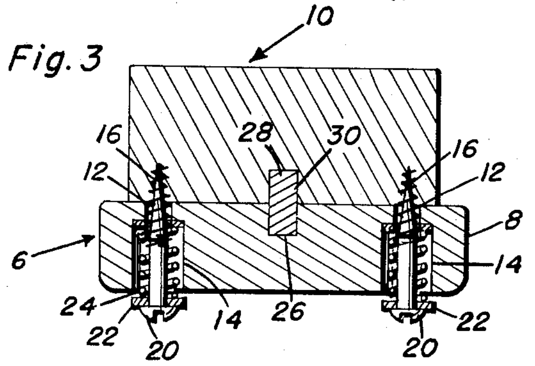
Figure 3 is a vertical section on the line 3—3 of Figure 2 looking in the direction of the arrows.

Referring now to the drawings it will be seen that the head, as a unit is denoted by the numeral 6. This head is adapted to be mounted atop a standard 8 forming a part of a portable pedestal or equivalent stand construction (not detailed here). The head takes the form of a substantially rectangular panel which is denoted by the numeral 8 and which is provided with flat top and bottom surfaces. A pair of duplicate jaws are provided at the respective end portions of the panel and these are denoted by the numerals 10—10 and they are exactly the same in construction. Therefore a description of one will suffice for both. It will be evident that at each end of the panel spaced parallel elongated slots 12—12 are provided. Each slot is provided with an aligned socket 14 as shown in Figure 3. The numeral 16 designates a woodscrew which passes through the socket and through the coacting slot and is screwed into the flat bottom surface 18 of the complemental jaw. The head of the screw is denoted at 20 and has a screw driver kerf and is provided with a washer 22 which surrounds the shank and provides an end thrust element for a coiled spring 24 and the coiled spring is located in the socket in the manner shown. Between the slots 12—12 there is an elongated groove 26 defining a keyway and this is registerable with a similar groove or keyway 28 formed in the underside of the jaw, that is, the body portion of the jaw. A key 30 is wedged and thus secured in the groove 28 and is consequently carried by the jaw and the lower half portion of the key is assembled and rides back and forth in the keyway 26.

Figures 1, 2:
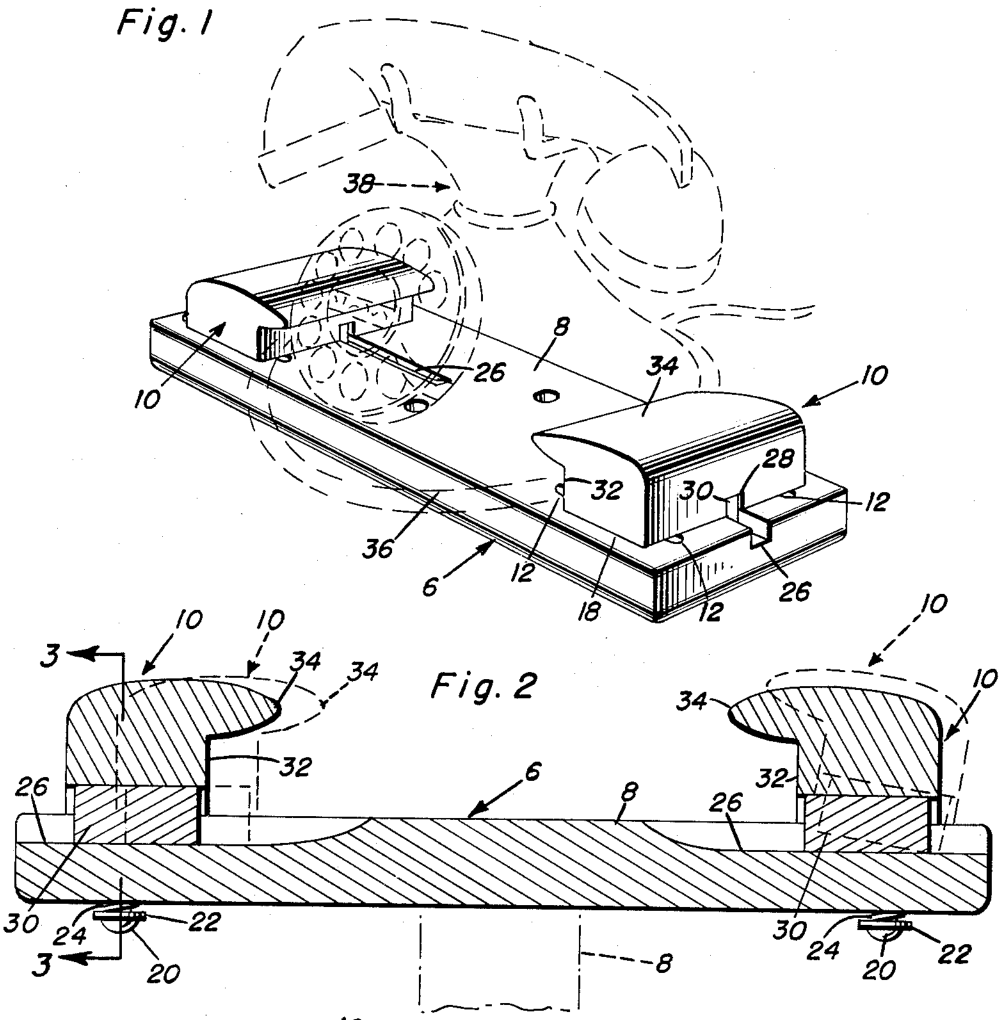
Figure 1 is a perspective view of a pedestal head (also called a stand) constructed in accordance with the principles of the present invention and showing in dotted lines the manner in which the base of the telephone is supported and retained thereon.
Figure 2 is a central longitudinal sectional view on a larger scale.

Each jaw is substantially rectangular in top plan and is of a length slightly less than the width of the panel. The opposed faces of the jaws are undercut as after 32 to provide overhanging lip or flange portions denoted by the numerals 34. It follows that these jaws are slidably mounted at opposite transverse end portions of the panel. They may be slid back and forth, that is, toward and from each other to vary the clamping space between themselves. When in clamping position they engage over substantially diametrically opposite portions of the peripheral portion 36 of the base of the telephone generally denoted by the numeral 38. The telephone may have either a circular base or an oval base and in either event the thus undercut or flanged jaws will serve to fit the base with requisite nicety. Both jaws are individually slidable and because of the lengths of the wood screws, the jaws are also tiltable, that is, may be tilted away from each other as shown in phantom lines in Figure 2. It is sometimes desirable to tilt one jaw back and to leave the other jaw unmoved. This depends on just how the user desires to slip the base of the telephone into position for retention between the jaws.

It would be within the purview of the invention to provide a base having one jaw fixedly mounted at the end of the panel portion and to provide the opposite end with spaced parallel slots 12—12, coacting sockets 14—14 and an intervening keyway 26 with a key carried by the jaw and slidable in the keyway.

It will be seen from the foregoing that the invention seeks to improve upon and reduce the number of parts entering into the combination and thereby not only increases the efficiency of the structure as a whole but also renders the same less costly to manufacture and otherwise simplifies factors assembling, sale and use.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

A telephone base in the form of a head applicable to the upper end of a standard on a telephone stand comprising a substantially rectangular panel having flat top and bottom surfaces, said panel being provided at each end wtih a pair of spaced parallel longitudinal slots opening through the top of the panel, the bottom side of the panel having sockets, said sockets registering with the respective slots and opening accessibly through the bottom of the panel, a pair of jaws slidably mounted against the top surface of the panel, each jaw having headed fasteners slidable in said slots and sockets, the headed portions of the fasteners projecting below and being wholly uncovered and availably accessible by way of the open undersides of the sockets, a coil spring surrounding each shank and located in the cooperating socket, said panel being provided between said slots and in its top surface with an elongated slot providing a keyway, said keyway opening through the adjacent transverse end of the panel, the coacting jaw having a key and said key being slidable back and forth in said keyway.

References Cited in the file of this patent

UNITED STATES PATENTS

| | | |
|---|---|---|
| 1,030,090 | Johnson | June 18, 1912 |
| 1,354,693 | Ryan | Oct. 5, 1920 |
| 1,990,002 | Schafer | Feb. 5, 1935 |
| 2,067,323 | Hirsch | Jan. 12, 1937 |
| 2,328,061 | Curtis | Aug. 31, 1943 |
| 2,622,835 | Ippolito | Dec. 23, 1952 |